United States Patent
Lee et al.

(10) Patent No.: US 12,205,012 B2
(45) Date of Patent: Jan. 21, 2025

(54) METHOD OF ACCELERATING TRAINING PROCESS OF NEURAL NETWORK AND NEURAL NETWORK DEVICE THEREOF

(71) Applicants: Samsung Electronics Co., Ltd, Suwon-si (KR); Seoul National University R&DB Foundation, Seoul (KR)

(72) Inventors: Seungwon Lee, Hwaseong-si (KR); Hanmin Park, Seoul (KR); Gunhee Lee, Seoul (KR); Namhyung Kim, Seoul (KR); Joonsang Yu, Seoul (KR); Kiyoung Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 467 days.

(21) Appl. No.: 16/550,498

(22) Filed: Aug. 26, 2019

(65) Prior Publication Data

US 2020/0065659 A1    Feb. 27, 2020

Related U.S. Application Data

(60) Provisional application No. 62/722,395, filed on Aug. 24, 2018.

(30) Foreign Application Priority Data

Dec. 17, 2018    (KR) ........................ 10-2018-0163309

(51) Int. Cl.
G06N 3/063    (2023.01)
G06N 3/04    (2023.01)
G06N 3/084    (2023.01)

(52) U.S. Cl.
CPC ............... G06N 3/063 (2013.01); G06N 3/04 (2013.01); G06N 3/084 (2013.01)

(58) Field of Classification Search
CPC .......... G06N 3/063; G06N 3/04; G06N 3/084; G06N 3/0445; G06N 3/088; G06N 3/0454; G06N 3/0481
See application file for complete search history.

(56) References Cited

U.S. PATENT DOCUMENTS 4,967,369 A * 10/1990 Jourjine .................. G06N 3/04
706/29
9,818,059 B1 * 11/2017 Woo ....................... G06N 3/045
(Continued)

FOREIGN PATENT DOCUMENTS

KR    10-2018-0007657 A    1/2018
KR    10-2018-0073118 A    7/2018

OTHER PUBLICATIONS

Kim, Dongyoung, Junwhan Ahn, and Sungjoo Yoo. "Zena: Zero-aware neural network accelerator." IEEE Design & Test 35.1 (2017) : 39-46. (Year: 2017).*

(Continued)

*Primary Examiner* — Miranda M Huang
*Assistant Examiner* — Sidney Vincent Bostwick
(74) *Attorney, Agent, or Firm* — NSIP Law

(57) ABSTRACT

A method of accelerating a training process of a neural network includes acquiring activations used in the training process and a bit-vector corresponding to the activations, selecting activations requiring an operation from among the acquired activations by using the bit-vector, and performing backward propagation using the selected activations and filters corresponding to the selected activations.

24 Claims, 12 Drawing Sheets

(56) References Cited

U.S. PATENT DOCUMENTS

| | | | |
|---|---|---|---|
| 2016/0180200 A1* | 6/2016 | Vijayanarasimhan | ................... G06V 30/194 706/20 |
| 2016/0342891 A1 | 11/2016 | Ross et al. | |
| 2017/0286830 A1* | 10/2017 | El-Yaniv | ............... G06N 3/0454 |
| 2018/0046900 A1* | 2/2018 | Dally | ..................... G06N 3/082 |
| 2018/0046906 A1* | 2/2018 | Dally | ........................ G06N 3/04 |
| 2018/0129893 A1 | 5/2018 | Son et al. | |
| 2018/0164866 A1* | 6/2018 | Turakhia | .................. G06N 3/02 |
| 2018/0189227 A1* | 7/2018 | Korthikanti | ......... G06F 9/30043 |
| 2018/0189638 A1 | 7/2018 | Nurvitadhi et al. | |
| 2018/0218518 A1 | 8/2018 | Yan et al. | |
| 2019/0205740 A1* | 7/2019 | Judd | ..................... G06N 3/0481 |
| 2021/0166113 A1 | 6/2021 | Lee et al. | |
| 2024/0152729 A1 | 5/2024 | Son et al. | |

OTHER PUBLICATIONS

Kostadinov, S. (2019) Understanding backpropagation algorithm, Medium. Towards Data Science. Available at: https://towardsdatascience.com/understanding-backpropagation-algorithm-7bb3aa2f95fd (Accessed: Feb. 10, 2023). (Year: 2019).*

Sefat, Md Syadus. "Design and Performance Analysis of Hardware Accelerator for Deep Neural Network in Heterogeneous Platform." (2018). (Year: 2018).*

Clopton, "Backpropagation Learning Algorithm", retrieved from http://web.archive.org/web/20151103080417/http://slideplayer.com:80/slide/2479213/ (Year: 2015).*

Kafunah, Jefkine. "Backpropagation in convolutional neural networks." DeepGrid—Organic Deep Learning, Nov. 29, 2016: 1-10. (Year: 2016).*

Han, Song, Huizi Mao, and William J. Dally. "Deep compression: Compressing deep neural networks with pruning, trained quantization and huffman coding." arXiv preprint arXiv:1510.00149 (2015). (Year: 2015).*

Chen, Tianshi et al., "DianNao: A Small-Footprint High-Throughput Accelerator for Ubiquitous Machine-Learning", ACM SIGPLAN Notices, vol. 49, Issue 4, Feb. 2014, (pp. 1-15).

Chen, Yunji et al., "DaDianNao: A Machine-Learning Supercomputer", *2014 47th Annual IEEE/ACM International Symposium on Microarchitecture*, 2014 (pp. 1-14).

Albericio, Jorge et al., "Cnvlutin: Ineffectual-Neuron-Free Deep Neural Network Computing", *2016 ACM/IEEE 43rd Annual International Symposium on Computer Architecture (ISCA)*, 2016 (pp. 1-13).

Andri, Renzo et al., YodaNN: An Ultra-Low Power Convolutional Neural Network Accelerator Based on Binary Weights, *2016 IEEE Computer Society Annual Symposium on VLSI (ISVLSI)*, Pittsburgh, PA, USA, Jul. 11-13, 2016 (pp. 236-241).

Kim, Dongyoung et al., "ZeNA: Zero-Aware Neural Network Accelerator", *IEEE Design & Test*, vol. 35, Issue 1, 2018 (pp. 1-8).

Park, Hyunsun, et al. "Zero and Data Reuse-aware Fast Convolution for Deep Neural Networks on GPU." *Proceedings of the Eleventh IEEE/ACM/IFIP International Conference on Hardware/Software Codesign and System Synthesis* Oct. 1-7, 2016 (10 pages in English).

Anwar, Sajid, et al. "Structured Pruning of Deep Convolutional Neural Networks." *ACM Journal on Emerging Technologies in Computing Systems (JETC)* vol. 13 Issue 3 Article 32, Feb. 2017 (18 pages in English).

Korean Office Action issued on Jan. 7, 2022 in counterpart Korean Patent Application No. 10-2017-0142570 (4 pages in English, 4 pages in Korean).

Korean Office Action issued on Oct. 24, 2024, in counterpart Korean Patent Application No. 10-2018-0163309 (6 pages in English, 8 pages in Korean).

* cited by examiner

FORWARD-PROPAGATION FILTERS (910)     BACKWARD-PROPAGATION FILTERS (920)

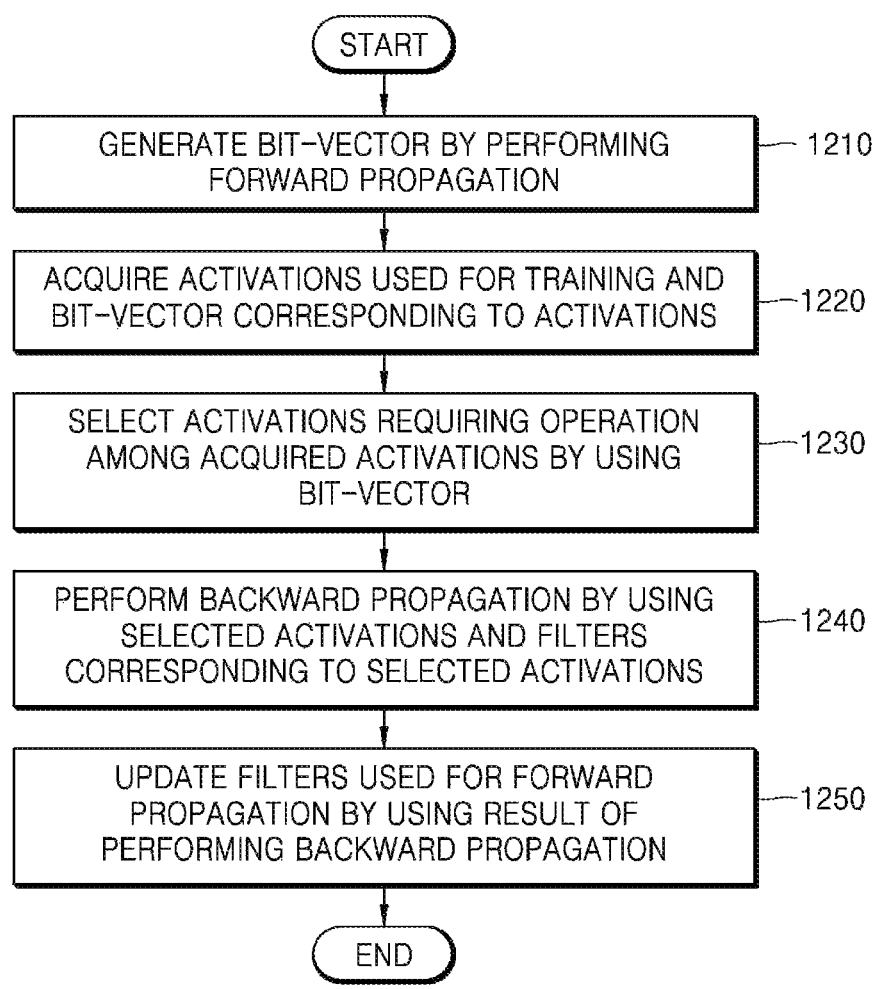

METHOD OF ACCELERATING TRAINING PROCESS OF NEURAL NETWORK AND NEURAL NETWORK DEVICE THEREOF

CROSS-REFERENCE TO RELATED APPLICATIONS

This application claims the benefit under 35 USC § 119 of U.S. Provisional Application No. 62/722,395, filed on Aug. 24, 2018, in the US Patent Office and Korean Patent Application No. 10-2018-0163309, filed on Dec. 17, 2018, in the Korean Intellectual Property Office, the entire disclosure of which are incorporated herein by reference for all purposes.

BACKGROUND

1. Field

The present disclosure relates to methods of accelerating a training process of a neural network.

2. Description of Related Art

Research is being actively conducted to classify input patterns in groups so that efficient pattern recognition may be performed on computers. This includes research on an artificial neural network (ANN) that is obtained by modeling pattern recognition characteristics using mathematical expressions through a processor-implemented neural network model, as a specialized computational architecture, which after substantial training may provide computationally intuitive mappings between input patterns and output patterns. The ANN generates mapping between input patterns and output patterns using an algorithm, and a capability of generating the mapping is expressed as a learning capability of the ANN. The ANN may employ an algorithm that mimics abilities to learn. Also, the ANN has a capability to generate a relatively correct output with respect to an input pattern that has not been used for training based on a result of previous training. However, because such operations or applications are performed through specialized computation architecture, and in different automated manners than they would have been performed in non-computer implemented or non-automated approaches, they also invite problems or drawbacks that only occur because of the automated and specialized computational architecture on which they are implement. For example, the ANN may require a large amount of operations on complex input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of accelerating a training process of a neural network, the method including acquiring activations used in the training process and a bit-vector corresponding to the activations, selecting activations requiring an operation from among the acquired activations by using the bit-vector, and performing backward propagation using the selected activations and filters corresponding to the selected activations.

The selecting may include selecting activations representing a non-zero value from among the acquired activations by interpreting bits included in the bit-vector.

The selecting may include selecting the activations requiring the operation from among the acquired activations, in response to a number of selected activations being less than N, where N is a number of multipliers in a single neural functional unit.

The selecting may include selecting the activations requiring the operation from among the acquired activations, in response to interpretation of all bits in the bit-vector not being completed.

The method may include generating the bit-vector by performing forward propagation on the neural network.

The performing of the backward propagation may include performing a multiplication and accumulation operation on the selected activations and the filters corresponding to the selected activations.

The performing of the backward propagation may include updating the acquired activations using a result of the multiplication and accumulation operation.

The filters corresponding to the selected activations may be obtained by rearranging filters used in forward propagation where the selected activations are generated.

The method may include updating filters used in forward propagation using a result of performing the backward propagation.

In another general aspect, there is provided a neural network device including a processor configured to read activations used in a training process and a bit-vector corresponding to the activations from the memory, select activations requiring an operation from among the read activations by using the bit-vector, read filters corresponding to the selected activations from the memory, and perform backward propagation using the selected activations and the read filters.

The processor may be configured to select activations representing a non-zero value from among the read activations by interpreting bits included in the bit-vector.

The processor may be configured to select the activations requiring the operation from among the read activations, in response to a number of selected activations being less than N, where N is a number of multipliers in a single neural functional unit.

The processor may be configured to select the activations requiring the operation from among the read activations, in response to interpretation of all bits in the bit-vector not being completed.

The processor may be configured to generate the bit-vector by performing forward propagation on the neural network.

The processor may be configured to perform a multiplication and accumulation operation on the selected activations and the filters corresponding to the selected activations.

The processor may be configured to update the acquired activations using a result of the multiplication and accumulation operation.

The filters corresponding to the selected activations may be obtained by rearranging filters used in forward propagation where the selected activations are generated.

The processor may be configured to update filters used in forward propagation using a result of performing the backward propagation.

The processor may be configured to record the updated filters in a memory.

Other features and aspects will be apparent from the following detailed description, the drawings, and the claims.

BRIEF DESCRIPTION OF THE DRAWINGS

FIG. 12 is a diagram illustrating an example in which a neural network device operates.

Figure 1:
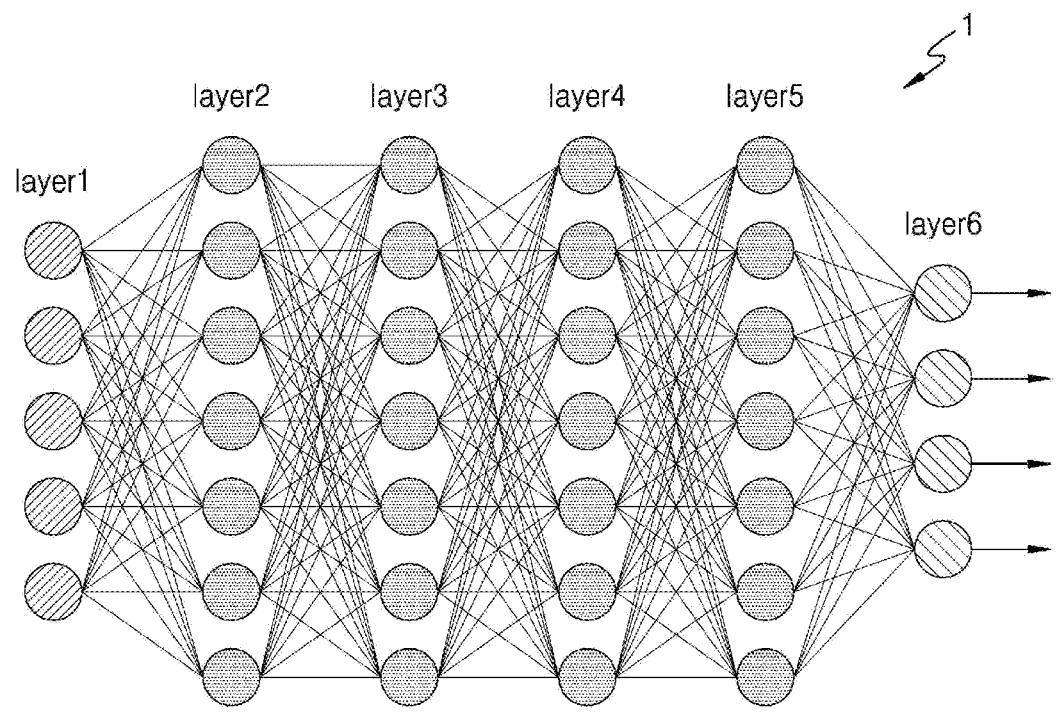
FIG. 1 is a diagram illustrating an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of a neural network.

In an example, the neural network 1 may correspond to a recurrent neural network (RNN) or a convolutional neural network (CNN). In an example, the CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. The DNN may be, but is not limited to, a convolutional neural network (CNN), a recurrent neural network (RNN), or the like. For example, the neural network 1 may be a DNN including an input layer layer1, a plurality of hidden layers, such as, for example, layer2, layer3, layer4, and layer5, and an output layer Layer6. In an example, neural network 1 may include a sub-sampling layer, a pooling layer, a fully connected layer, etc., in addition to the convolution layer.

When the neural network 1 is implemented as a DNN, it may include a plurality of layers capable of processing valid information. Thus, according to the neural network 1, more complex data sets may be processed than in a neural network including a single layer. In FIG. 1, the neural network 1 is illustrated as including six layers; however, this is merely an example. The neural network 1 may include fewer or more layers than those illustrated in FIG. 1. That is, the neural network 1 may include layers of various structures different from those illustrated in FIG. 1.

The neural network 1 may be trained to perform a desired operation by mapping input data and output data that have a nonlinear relationship therebetween through deep learning to perform tasks such as, for example, object classification, object recognition, audio or speech recognition, and image recognition. The deep learning is a machine learning method used to solve a problem given from a big dataset. The deep learning may also be construed as a problem-solving process for optimization to find a point where energy is minimized while training the neural network using provided training data. Through the deep learning, for example, supervised or unsupervised learning, a weight corresponding to an architecture or a model of the neural network may be obtained, and the input data and the output data may be mapped to each other based on the obtained weight.

In an example, the neural network 1 may be implemented as an architecture having a plurality of layers including an input image, feature maps, and an output. In neural network 1, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In another example, the neural network 1 may include an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network. Input data for the neural network 1 may include image data, voice data, and text data. However, they are provided as examples only, and other types of data are considered to be well within the scope of the present disclosure.

Figure 2:
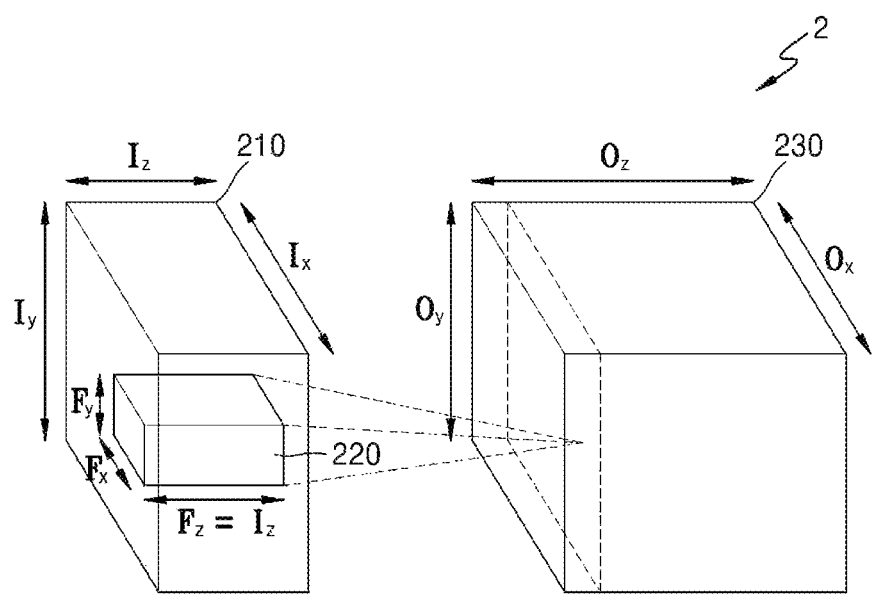
FIG. 2 is a diagram illustrating an example of a convolution layer.

FIG. 2 is a diagram illustrating an example of a convolution layer.

FIG. 2 illustrates a portion of a convolution layer 2. As described above, in addition to the convolution layer 2 illustrated in FIG. 2, a neural network may include a pooling layer, a fully connected layer, and/or the like. The convolution layer 2 of FIG. 2 may include an input activation map 210 having a size of Ix×Iy×Iz, a filter 220 having a size of Fx×Fy×Iz, and an output activation map 230 having a size of Ox×Oy×Oz.

The input activation map 210, the filter 220, and the output activation map 230 may respectively include input activations, weights, and output activations. The input activation map 210 may be convoluted with the filter 220, and the output activation map 230 may be generated as a result thereof.

In an example, the filter 220 and the input activation map 210 may be convoluted by a sliding window method. Particularly, the weights and the input activations in a first window may be respectively multiplied and then added together. Then, the first window may move in an axial direction (e.g., x-axis, y-axis, or z-axis) to construct a second window. Then, the weights and the input activations in the second window may be respectively multiplied and then added together. As operations are performed successively in this way, the output activation map 230 may be generated.

Although only one filter 220 is illustrated in FIG. 2, a plurality of filters 220 may be convoluted with the input activation map 210 to generate the output activation map 230.

The above operation may be simply expressed in a multiplication and accumulation form of input activations and weights. Equation 1 below expresses a multiplication and accumulation operation in which N products of input activations "a" and weights "w" are added together.

$$S = \sum_{i=1}^{N} a_i \times w_i \qquad \text{Equation 1}$$

In Equation 1, $a_i$ denotes an i-th input activation, $w_i$ denotes an i-th weight, and S denotes a result value of a multiplication and accumulation operation.

The input of a rectified linear unit (ReLU) activation function used in the neural network may be the result of the multiplication and accumulation operation. The ReLU activation function may be defined as $f(x)=\max(0, x)$. When the input is a negative number, 0 is output; and when the input is a positive number, the input is output as is.

As the application of neural networks increases, the performance and scale of neural networks also improve. For the neural network to operate properly (i.e., in order to improve the accuracy of the output of the neural network), the neural network may have to be trained using a large number of data sets.

However, in many cases, training of the neural network may require a long time and many operations. Thus, it may be important to reduce the training costs such as, for example, time, calculation amount, and computational resources by accelerating the training of the neural network.

In an example, a neural network device may reduce the training costs by accelerating the training of the neural network. Particularly, the neural network device may reduce the training costs by reducing the amount of calculations required for a backward propagation process.

Forward propagation, backward propagation, and weight update will be further described below with reference to FIG. 3.

Figure 3:
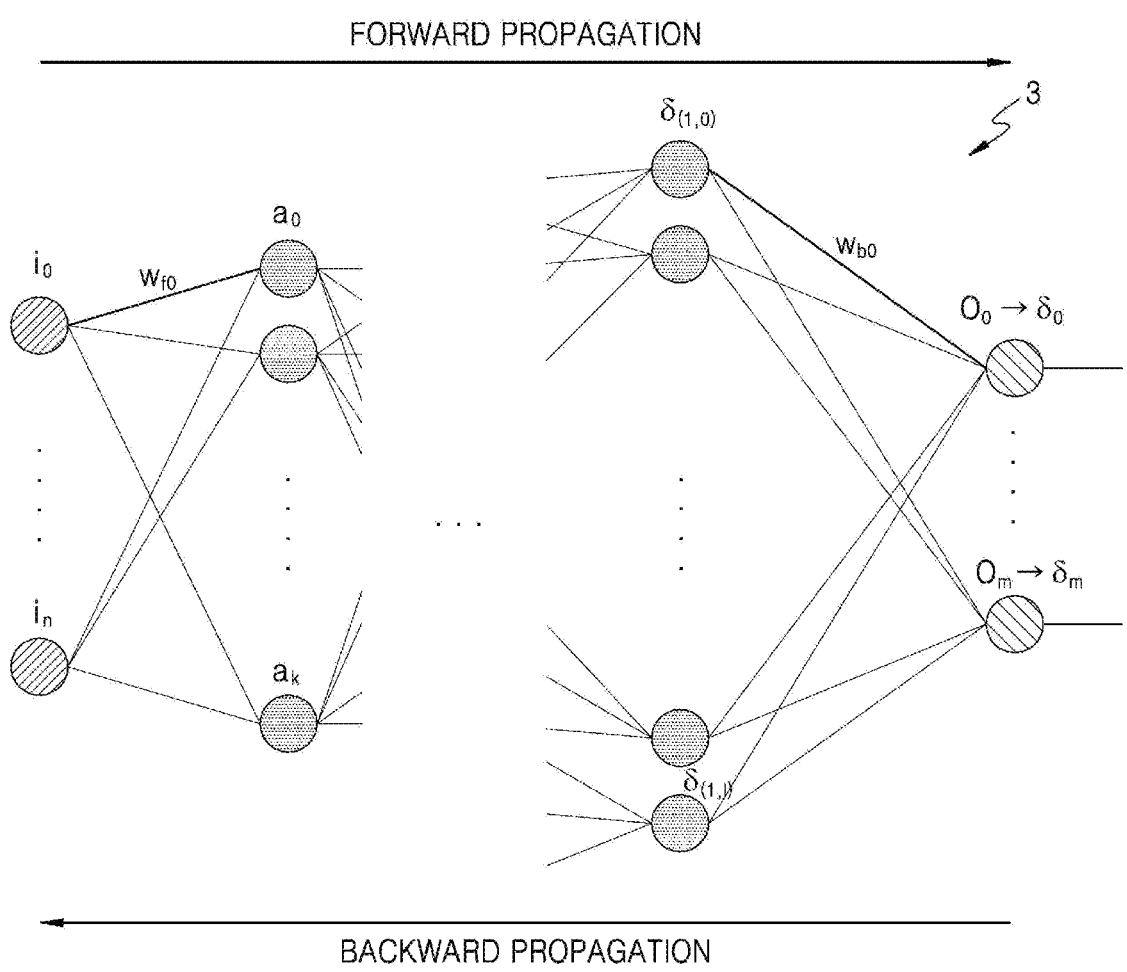
FIG. 3 is a diagram illustrating an example of forward propagation, backward propagation, and weight update.

FIG. 3 is a diagram illustrating forward propagation, backward propagation, and weight update.

FIG. 3 illustrates an example of a neural network 3 including a plurality of layers. According to the neural network 3, final output activations $o_0, \ldots, o_m$ may be generated as initial input activations $i_0, \ldots, i_n$ are operation-performed through at least one hidden layer. Here, the operation may include a process of performing a multiplication and accumulation operation on input activations and weights in each layer and generating an output activation by applying a ReLU activation function to the result of the multiplication and accumulation operation.

Forward propagation may refer to a process in a direction in which the final output activations $o_0, \ldots, o_m$ are generated by the initial input activations $i_0, \ldots, i_n$. For example, the initial input activations $i_0, \ldots, i_n$ may be operation-performed with weights to generate intermediate output activations $a_0, \ldots, a_k$. The intermediate output activations $a_0, \ldots, a_k$ may be the input activations of the next process, and the above operation may be performed again. Through this process, the final output activations $o_0, \ldots, o_m$ may be generated.

The above forward propagation process may be summarized as Equation 2 below.

$$O(x, y, z) = \sum_{i=0}^{F_x-1} \sum_{j=0}^{F_y-1} \sum_{k=0}^{F_z-1} I(x+i, y+j, k) \times F(i, j, k, n) \qquad \text{Equation 2}$$

In Equation 2, I(x, y, z) denotes an input activation of the current layer, and O(x, y, z) denotes an output activation of the current layer. Also, F(i, j, k, n) denotes a weight of an n-th filter. The forward propagation may be ended by repeating the operation of Equation 2 Ox×Oy×Oz times.

When the final output activations $o_0, \ldots, o_m$ are generated, the final output activations $o_0, \ldots, o_m$ may be compared with the expected result to generate an error δ. For example, the error δ may be the difference between the expected result and the final output activations $o_0, \ldots, o_m$, and the training of the neural network 3 may have to be performed in the direction of reducing the error δ.

In order for the error δ to be small, the activations used in the previously-performed intermediate operations may have to be updated as the final errors $δ_0, \ldots, δ_m$ propagate (i.e., backward propagation) in the opposite direction of the forward propagation direction. For example, the final errors $δ_0, \ldots, δ_m$) may be operation-performed with weights to generate intermediate errors $δ_{(1,0)}, \ldots, δ_{(1,l)}$. The intermediate errors $δ_{(1,0)}, \ldots, δ_{(1,l)}$ may be the input for generating the intermediate errors of the next layer, and the above operation may be performed again. Through this process, the error δ may propagate in the opposite direction of the forward propagation direction, and an activation gradient used to update the activations may be calculated. However, a filter used in backward propagation may be obtained by rearranging a filter of forward propagation. The filter used in backward propagation will be described below with reference to FIG. 9.

The above backward propagation process may be summarized as Equation 3 below.

$$\Delta I(x, y, z) = \sum_{i=0}^{Fx-1} \sum_{j=0}^{Fy-1} \sum_{k=0}^{Fn-1} \Delta O'(x+i, y+j, k) \times F(i, j, z, k) \quad \text{Equation 3}$$

In Equation 3, ΔI(x, y, z) denotes an output in backward propagation, which means a gradient of an input activation of the current layer in forward propagation. Also, ΔO(x, y, n) is an input in backward propagation, which means a gradient of an input activation of the next layer in forward propagation. However, ΔO'(x, y, n) may mean that zero padding is performed on ΔO(x, y, n). Also, F(I, j, z, k) denotes a weight of a filter, which means a weight of a filter obtained by rearranging a filter of forward propagation. The backward propagation may be ended by repeating the operation of Equation 3 Ix×Iy×Iz times.

As described above, when backward propagation is performed on all layers of the neural network 3, the weight may be updated based on the result of backward propagation. Particularly, the gradient of weight used to update the weight may be calculated by using the activation gradient calculated according to the backward propagation. The weight update may be summarized as Equation 4 below.

$$\Delta W(x, y, z, n) = \sum_{i=0}^{Ox-1} \sum_{j=0}^{Oy-1} \Delta O'(x+i, y+j, n) \times I(i, j, z) \quad \text{Equation 4}$$

In Equation 4, ΔW(x, y, z, n) denotes a weight gradient and I(i, j, z) denotes an input activation of the current layer. Also, ΔO(x, y, n) denotes a gradient of an output activation of the current layer (i.e., a gradient of an input activation of the next layer). However, ΔO'(x, y, n) may mean that zero padding is performed on ΔO(x, y, n). The weight update may be ended by repeating the operation of Equation 4 Fx×Fy×Fz×Fn times.

Through the above backward propagation and weight update, the neural network 3 may be trained. Thus, in order to reduce the training costs of the neural network 3, it may be important to reduce the amount of calculations of backward propagation.

The forward propagation process may include applying a ReLU activation function to activation. Thus, some of the output activations of the forward propagation may be zero (0). This may mean that some of the input activations of the backward propagation may also be zero.

In the process of performing backward propagation, no calculation may have to be performed on an input activation of 0. That is, since the backward propagation includes a multiplication and accumulation operation on the input values, the result value thereof may be 0 when the input value is 0 (zero). Thus, when it may be foreknown that the input value of the backward propagation is 0, the amount of calculations of the backward propagation may be reduced.

In an example, a neural network device may reduce the amount of calculations of backward propagation by using a bit-vector generated in the process of forward propagation. Particularly, with reference to the bit-vector, the neural network device may determine whether the input activation of the backward propagation is 0 and perform backward propagation only on the non-zero input activation. Thus, the neural network device may reduce the training costs of the neural network.

In an example, a neural network device and an example in which the neural network device operates will be described below in detail with reference to FIGS. 4 to 12.

Figure 4:
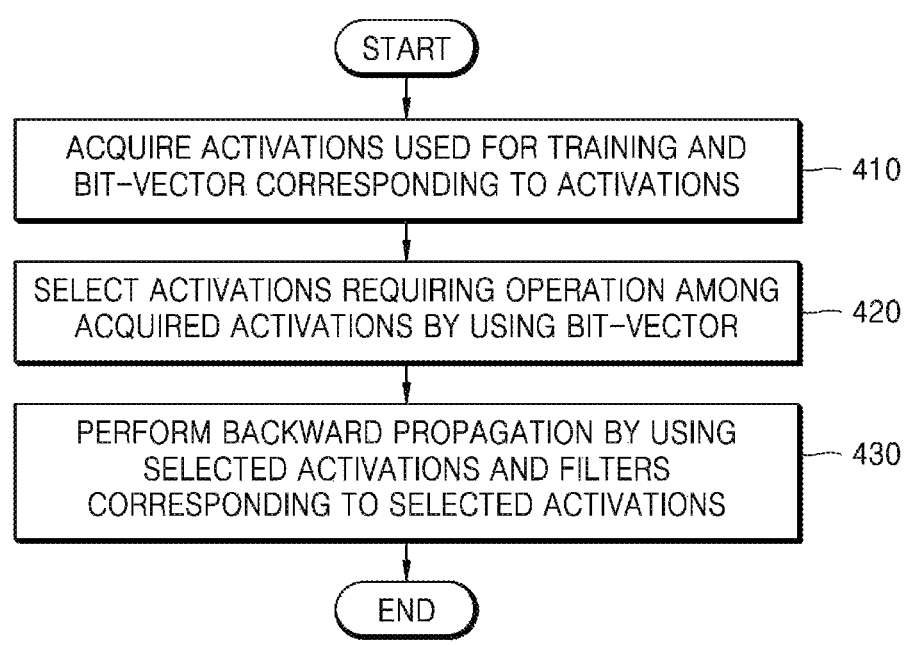
FIG. 4 is a diagram illustrating an example in which a neural network device operates.

FIG. 4 is a diagram illustrating an example in which a neural network device operates. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4 and are incorporated herein by reference. Thus, the above description may not be repeated here.

The diagram illustrated in FIG. 4 may include operations that are processed in a time-series manner in neural network devices 5 and 10 to be described below with reference to FIGS. 5 and 10. Thus, even when omitted below, the contents to be described below with reference to FIGS. 5 and 10 may also be applied to a method illustrated in FIG. 4.

In operation 410, the neural network device may acquire activations used for training and a bit-vector corresponding to the activations.

The activations used for training may mean output activations in each layer generated through forward propagation. The neural network device may perform forward propagation to generate output activations and a bit-vector for each layer. In order to perform backward propagation, the neural network device may acquire output activations of the forward propagation and a bit-vector corresponding to the output activations of the forward propagation. In an example, the neural network device may read a bit-vector and output activations stored in a memory.

In operation 420, the neural network device may select activations requiring an operation among the activations acquired through operation 410 by using the bit-vector.

The activations requiring the operation may mean activations representing a non-zero value among the activations acquired through operation 410. That is, the neural network device may select activations representing a non-zero value among the activations acquired through operation 410 by analyzing the bits included in the bit-vector.

In an example, each bit included in the bit-vector may correspond to a single activation. Also, the arrangement order of the bits in the bit-vector may be the same as the arrangement order of the output activations of the forward propagation. Thus, by interpreting the bits included in the bit-vector, the neural network device may know which activation represents a non-zero value.

In an example, the neural network device may perform an activation selection process of operation 420 until the number of selected activations becomes N. Here, N denotes the number of multipliers included in a single neural functional unit. When the number of selected activations satisfies N, the neural network device may perform operation 430 even though the interpretation of a single bit-vector is not completed.

As another example, the neural network device may perform an activation selection process of operation 420 until the analysis of all bits included in a single bit-vector is ended.

In operation 430, the neural network device may perform backward propagation using the activations selected through operation 420 and the filters corresponding thereto.

The filters used in operation 430 may mean filters obtained by rearranging the filters used in the forward propagation. In other words, the neural network device may perform backward propagation by using some of the output activations of the forward propagation and filters obtained by rearranging the filters of the forward propagation.

In an example, the neural network device may perform backward propagation by performing a multiplication and accumulation operation on some of the output activations of the forward propagation and the filters obtained by rearranging the filters of the forward propagation. Also, the neural network device may update the activations selected through operation 420 by using the result of the multiplication and accumulation operation. Also, the neural network device may update the weights of the filters used in the forward propagation by using the result of performing the backward propagation. Here, the backward propagation and the weight update may be the same as described above with reference to FIG. 3.

The embodiment described above with reference to FIG. 4 will be described below in more detail.

Figure 5:
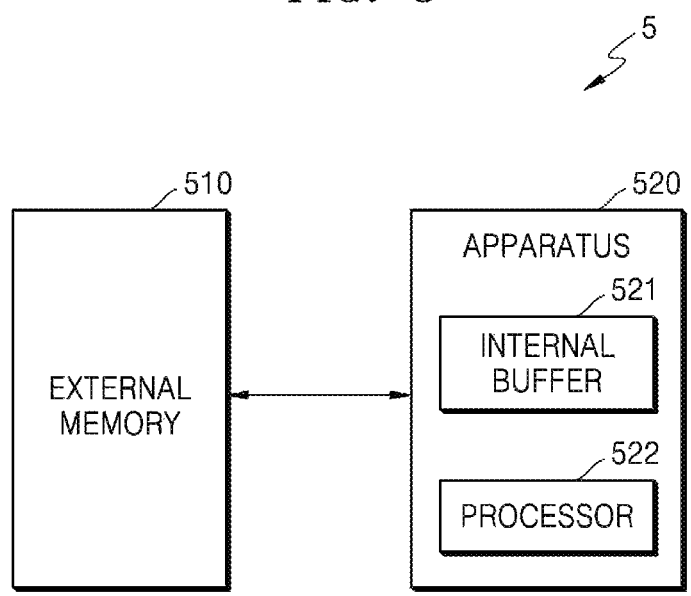
FIG. 5 is a diagram illustrating an example of a neural network device.

FIG. 5 is a diagram illustrating an example of a neural network device 5.

Referring to FIG. 5, a neural network device 5 may include an external memory 510 and an apparatus 520. The apparatus 520 may include an internal buffer 521 and a processor 522. In the neural network device 5 illustrated in FIG. 5, only the components related to the embodiment are illustrated, the neural network device 5 may further include other general-purpose components in addition to the components illustrated in FIG. 5.

Also, the processor 522 may be implemented as an array of logic gates, or may be implemented as a combination of a general-purpose microprocessor and a memory that stores a program executable in the general-purpose microprocessor. Also, the processor 522 may be implemented as other types of hardware. Further description of the processor 522 is provided below.

Also, in FIG. 5, the apparatus 520 is illustrated as including a single processor 522; however, it is not limited thereto. In other words, as needed, the apparatus 520 may include a plurality of processors.

Another exam of the neural network device 5 will be described below with reference to FIG. 10.

The external memory 510 may store data generated by the operation of the apparatus 520. For example, the external memory 510 may store data generated as the apparatus 520 performs forward propagation or backward propagation. The external memory 510 may be dynamic random access memory (DRAM) but is not limited thereto. Further description of the external memory 510 is provided below.

The apparatus 520 may include the processor 522 for performing a neural network operation and the internal buffer 521 for temporarily storing data for the operation of the processor 522. However, the internal buffer 521 may be selectively included in the apparatus 520, and the external memory 510 may perform the function of the internal buffer 521 in some cases.

The processor 522 may perform forward propagation and backward propagation through the neural network. Also, the processor 522 may perform a weight update.

The processor 522 may acquire activations used for training and a bit-vector corresponding to the activations. In an example, the processor 522 may read the bit-vector and the activations from the external memory 510.

The processor 522 may perform forward propagation to generate output activations and a bit-vector. In an example, the processor 522 may generate a bit-vector with reference to the values of output activations of the forward propagation and store the output activations and the bit-vector in the external memory 510. To perform backward propagation, the processor 522 may read the bit-vector and the output activations of the forward propagation (i.e., the input activations of the backward propagation) from the external memory 510.

An example in which the processor 522 generates a bit-vector will be further described below with reference to FIG. 6.

Figure 6:
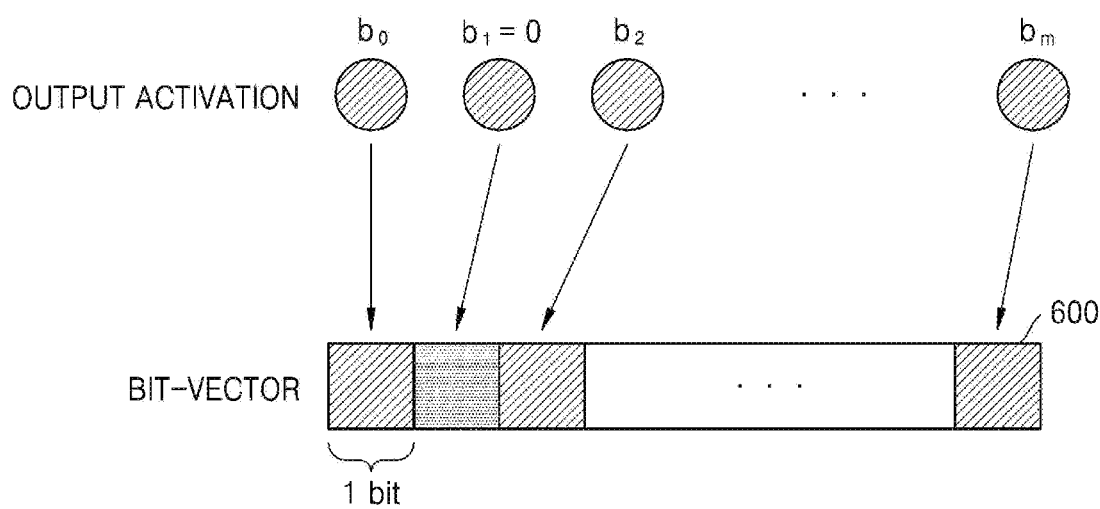
FIG. 6 is a diagram illustrating an example in which a processor generates a bit-vector.

FIG. 6 is a diagram illustrating an example in which a processor generates a bit-vector.

FIG. 6 illustrates an example of forward-propagation output activations $b_0, \ldots, b_m$ and a bit-vector 600.

The forward propagation may include a process of applying a ReLU activation function. Thus, some of the forward-propagation output activations $b_0, \ldots, b_m$ may represent 0 (zero). The processor 522 may detect the value of the output activations $b_0, \ldots, b_m$ and generate the bit-vector 600 according to whether the detected value is 0.

For example, assuming that $b_1$ among the output activations $b_0, \ldots, b_m$ illustrated in FIG. 6 represents 0, the processor 522 may set the bit corresponding to $b_1$ in the bit-vector 600 differently from other bits. Thus, when the bit-vector 600 is detected, it may be possible to know which output activation among the output activations $b_0, \ldots, b_m$ is 0.

In an example, the processor 522 may store the generated bit-vector in the external memory 510.

Referring to FIG. 5, the processor 522 may use the bit-vector to select activations requiring a backward propagation operation among the activations read from the external memory 510. For example, the processor 522 may interpret the bits included in the bit-vector to select activations representing a non-zero value among the activations read from the external memory 510.

An example in which the processor 522 selects activations will be described below with reference to FIG. 7.

Figure 7:
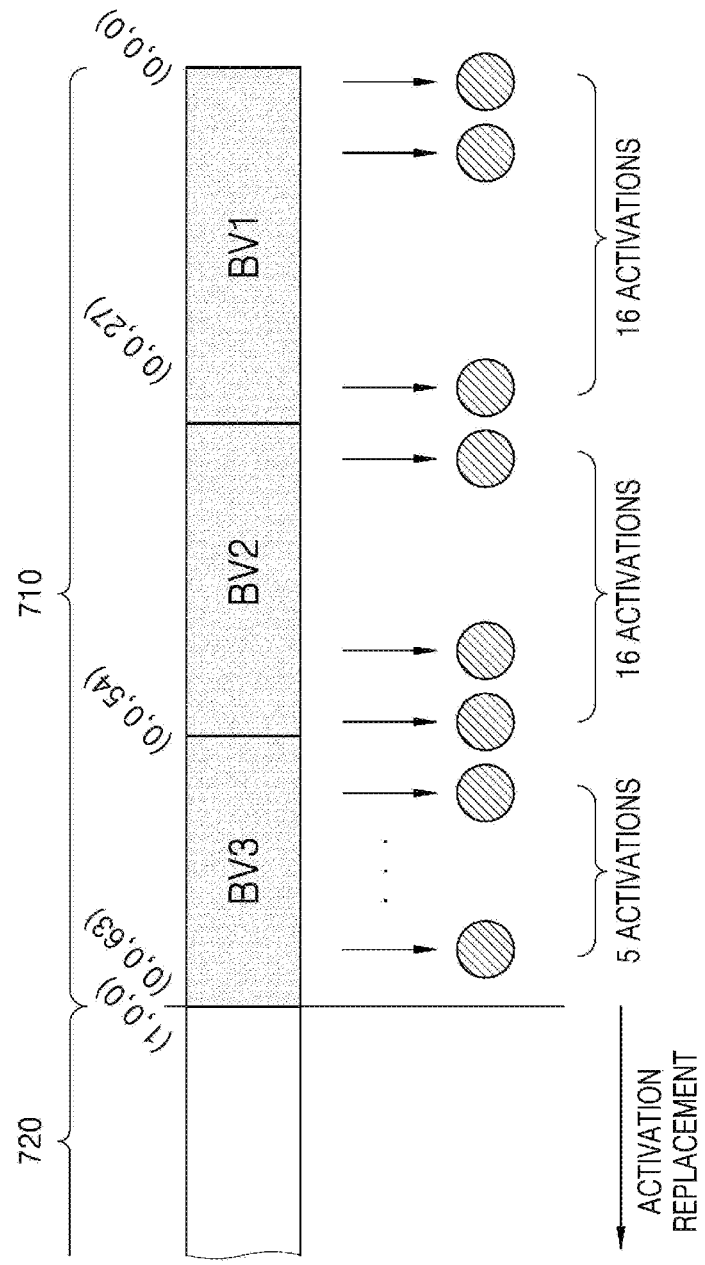
FIG. 7 is a diagram illustrating an example in which a processor selects activations by using a bit-vector.

FIG. 7 is a diagram illustrating an example in which a processor selects activations by using a bit-vector.

FIG. 7 illustrates an example of a bit-vector. FIG. 7 illustrates an example in which a first bit-vector 710 representing coordinates (0, 0, 0) to coordinates (0, 0, 63) includes a total of three portions BV1, BV2, and BV3. Hereinafter, for convenience of description, it is assumed that the processor 522 reads other activations from the external memory 510 when the x-axis coordinate or the y-axis coordinate of the bit-vector changes. In other words, it is assumed that the processor 522 may read the activations corresponding to the portions BV1, BV2, and BV3 of the first bit-vector 710 from the external memory 510 at one time.

The processor 522 may sequentially interpret the bits included in the bit-vector. Then, the processor 522 may select an activation representing a non-zero value among the activations read from the external memory 510.

As an example, the processor 522 may select an activation representing a non-zero value in units equal to the number of multipliers included in a single neural functional unit. For example, assuming that 16 multipliers are included in each single neural functional unit, the processor 522 may select non-zero activations in units of 16. Thus, the use rate of the neural functional unit included in the neural network device 5 may be maximized.

In an example, the processor 522 may select a total of 16 activations by interpreting the bits included in the portion BV1. Thereafter, the processor 522 may perform backward propagation by using the selected activations. Thereafter, the processor 522 may interpret the portion BV2, select a total of 16 activations, and perform backward propagation.

Meanwhile, upon ending the interpretation of the bit vector for activations that may be read from the external memory 510 at one time, the processor 522 may perform backward propagation by using the activations selected until then even when the number of selected activations does not reach the number of multipliers. For example, even though the processor 522 has selected a total of five non-zero activations by interpreting the portion BV3 (i.e., less than 16 according to the above assumption), the processor 522 may no longer interpret the bit-vector and perform backward propagation by using the selected activations.

Thereafter, the processor 522 may read other activations from the external memory 510 (i.e., activation replacement) and repeat the process described above with reference to FIG. 7. In an example, the processor 522 may read other activations from the external memory 510 and repeat the above process based on a second bit-vector 720.

Referring to FIG. 5, the processor 522 may perform backward propagation by using the selected activations and the filter corresponding thereto. In an example, the processor 522 may select the activations according to the process described above with reference to FIG. 7. Then, the processor 522 may read the filter corresponding to the selected activations from the external memory 510. Then, the processor 522 may rearrange the read filter and perform backward propagation. That is, the processor 522 may perform a multiplication and accumulation operation on the selected activations and the rearranged filters. The descriptions of the processor 522 performing the backward propagation are the same as those given above with reference to FIG. 3.

As described above, in order to perform backward propagation, the processor 522 may perform zero padding on the activations and rearrange the filters. An example in which the processor 522 performs zero padding and an example in which the processor 522 rearranges filters will be described below with reference to FIGS. 8 and 9.

Figure 8:
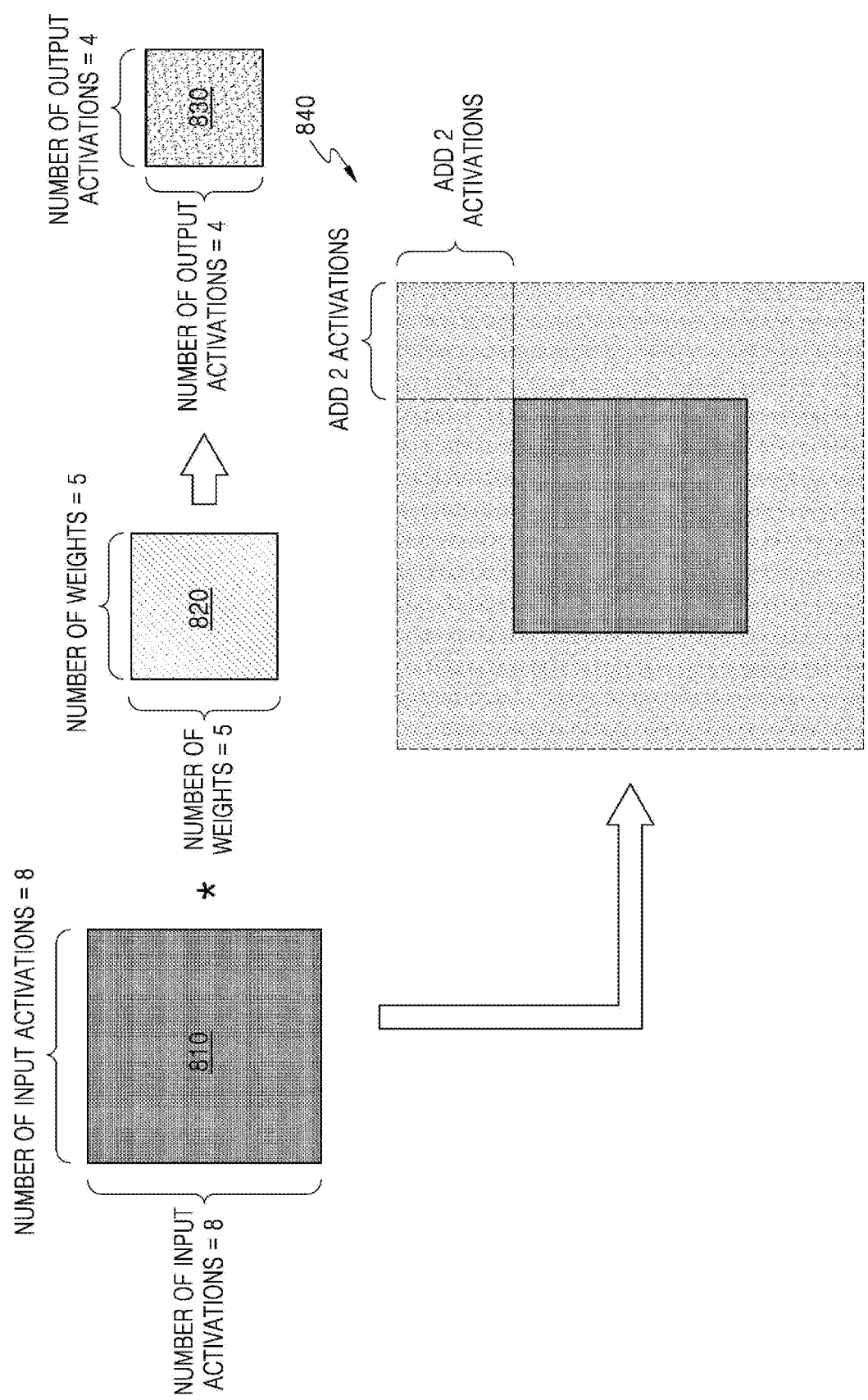
FIG. 8 is a diagram illustrating an example in which a processor performs zero padding.

FIG. 8 is a diagram illustrating an example in which a processor performs zero padding.

FIG. 8 illustrates an example of input activations 810 and weights 820 used for backward propagation. However, the input activations 810, the weights 820, output activations 830, and zero-padded activations 840 illustrated in FIG. 8 are merely examples. That is, the input activations 810, the weights 820, the output activations 830, and the zero-padded activations 840 may be modified without departing from the illustrated example described.

The processor 522 may perform backward propagation through a multiplication and accumulation operation on the input activations 810 and the weights 820. However, as described above with reference to FIG. 2, since the processor 522 performs a multiplication and accumulation operation by a sliding window method, the number of output activations 830 may be less than the number of input activations 810.

For example, assuming that the input activations 810 are an 8×8 matrix and the weights 820 are a 5×5 matrix, the output activations 830 may be generated as a 4×4 matrix. Thus, as an operation is performed on a plurality of layers, since the number of output activations 830 gradually converges to one, a subsequent operation may not be possible. That is, the output activations 830 may have to be generated in the same dimension as the input activations 810.

In an example, the processor 522 may increase the number of input activations 810 by performing zero padding on the input activations 810. Here, the zero padding may mean inserting 0 (zero) into the input activations 810. For example, the processor 522 may insert four zeros into the input activations 810 as each of the x-coordinate and y-coordinate components. That is, the processor 522 may perform zero padding to generate input activations 840 (i.e., the zero-padded activations 840) corresponding to a 12×12 matrix.

The processor 522 may perform a multiplication and accumulation operation on the input activations 840 and the weights 820. Accordingly, since output activations corresponding to an 8×8 matrix are generated, they have the same dimension as the input activations 810. Thus, the processor 522 may also perform a multiplication and accumulation operation on the next layer.

Figure 9:
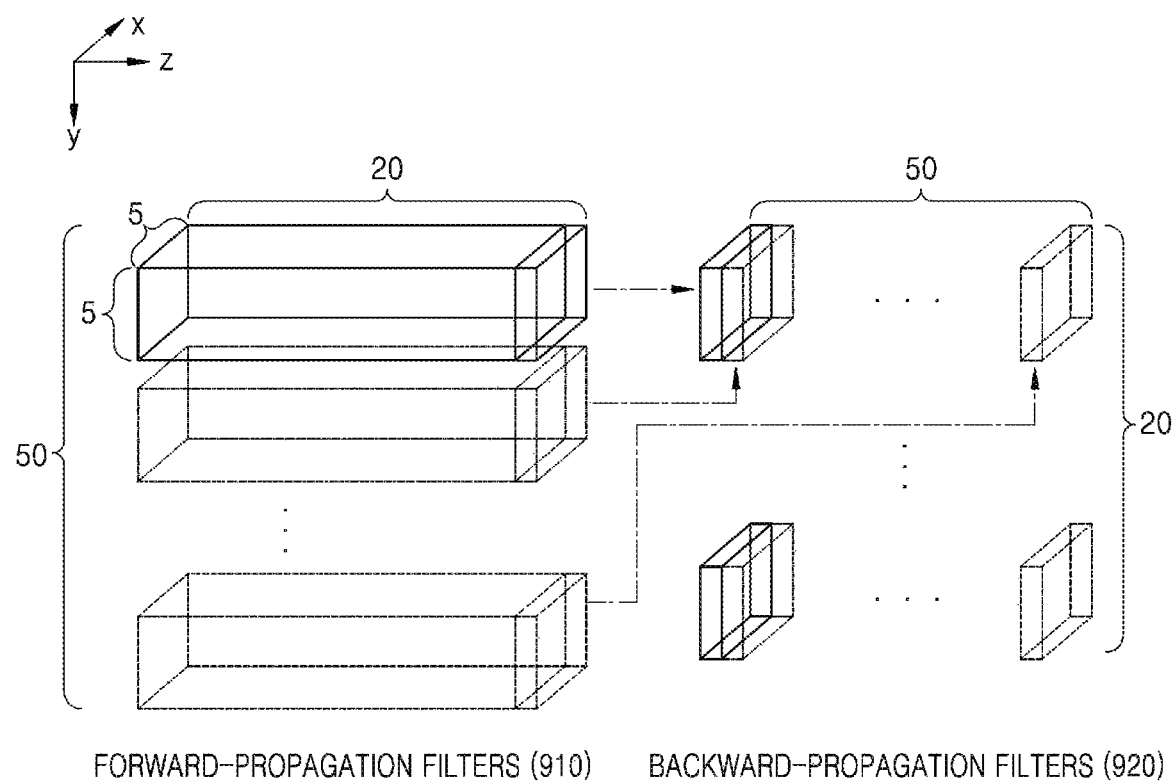
FIG. 9 is a diagram illustrating a filter used in backward propagation.

FIG. 9 is a diagram illustrating a filter used in backward propagation.

FIG. 9 illustrates an example of filters used for forward propagation and filters used for backward propagation. However, the filter illustrated in FIG. 9 is illustrated only for convenience of description, and the type and size of the filter are not limited to those illustrated in FIG. 9.

Referring to FIG. 9, it is assumed that forward-propagation filters 910 are 50 filters of a 5×5×20 matrix. The processor 522 may rearrange the forward-propagation filters 910 to construct backward-propagation filters 920.

For example, the processor 522 may construct the backward-propagation filters 920 by combining elements having the same z component in the forward-propagation filters 910. Particularly, the processor 522 may construct one backward-propagation filter by combining 50 X×Y matrixes having the same z component. In this case, a total of 20 backward-propagation filters 920 may be generated.

Referring to FIG. 5, the processor 522 may propagate the error δ to each layer of the neural network as the processor 522 performs the backward propagation. Then, the processor 522 may update the activations by using the propagated error δ.

Figure 10:
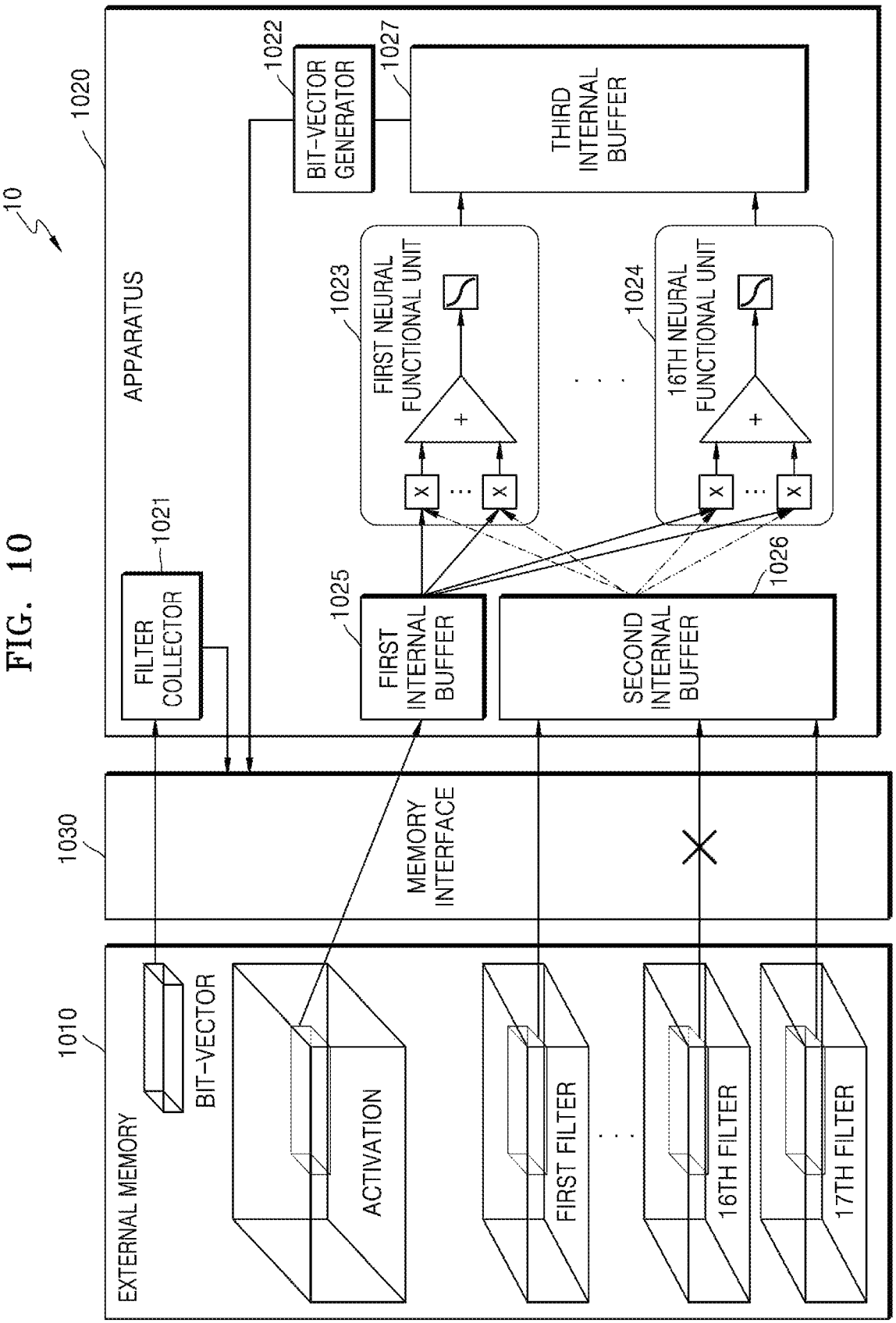
FIG. 10 is a diagram illustrating an example of a neural network apparatus.

FIG. 10 is a diagram illustrating another example of a neural network device.

Referring to FIG. 10, in an example, a neural network device 10 may include an external memory 1010, an apparatus 1020, and a memory interface 1030. The apparatus 1020 may include a filter collector 1021, a bit-vector generator 1022, a plurality of neural functional units 1023 and 1024, and first, second, and third internal buffers 1025, 1026, and 1027.

In the neural network device 10 illustrated in FIG. 10, only the components related to the embodiment are illustrated, and the neural network device 10 may further include other general-purpose components in addition to the components illustrated in FIG. 10.

In an example, the filter collector 1021, the bit-vector generator 1022, and the plurality of neural functional units 1023 and 1024 may correspond to the processor 522 of FIG. 5. For example, the filter collector 1021, the bit-vector generator 1022, and the plurality of neural functional units 1023 and 1024 may be implemented as separate processors or as a single processor. Also, the first, second, and third internal buffers 1025, 1026, and 1027 may correspond to the internal buffer 521 of FIG. 5. In an example, the first, second, and third internal buffers 1025, 1026, and 1027 may be implemented as separate buffers or as a single buffer.

The memory interface 1030 may relay data communication between different apparatuses. Thus, even when omitted below, the data communication between the external memory 1010 and the apparatus 1020 may pass through the memory interface 1030.

The apparatus 1020 may read the activations and filters from the external memory 1010 to perform forward propagation.

In an example, the activations to be currently calculated may be read from the external memory 1010 and temporarily stored in the first internal buffer 1025. Also, the filters to be currently calculated may be read from the external memory 1010 and temporarily stored in the second internal buffer 1026. In this case, like the number of neural functional units 1023 and 1024, the activations and filters may be read from the external memory 1010.

For example, each of the neural functional units 1023 and 1024 may include a plurality of multipliers, an adder tree, and a function applier. In this case, the number of multipliers may be equal to the number of activations and filters read from the external memory 1010. Also, the function applier may be a unit applying a ReLU activation function.

The outputs of the neural functional units 1023 and 1024 may be stored in the third internal buffer 1027 to generate output activations. In an example, the output activations may be stored in the external memory 1010. In this case, the bit-vector generator 1022 may identify the output activations to generate a bit-vector. Then, the bit-vector may be stored in the external memory 1010.

To perform backward propagation, the apparatus 1020 may read the activations of the currently-calculated layer from the external memory 1010 and store the same in the first internal buffer 1025. Then, the filter collector 1021 may read the bit-vector from the external memory 1010. Here, the activations read from the external memory 1010 may be the output activations generated in the above forward propagation process. The bit-vector read from the external memory 1010 may be a bit-vector corresponding to the activations that has been read.

The filter collector 1021 may interpret the bit-vector and select activations representing a non-zero value from among the activations stored in the first internal buffer 1025. For example, the filter collector 1021 may select activations until the number of activations is equal to the number of multipliers included in each of the neural functional units 1023 and 1024. When the interpretation of a single bit-vector is ended, the selection operation may be stopped even though the number of selected activations is less than the number of multipliers. In an example, the filter collector 1021 may read the filters corresponding to the selected activations from the external memory 1010 and stores the same in the second internal buffer 1026.

The neural functional units 1023 and 1024 may perform a multiplication and accumulation operation by using the activations stored in the first internal buffer 1025 and the filters stored in the second internal buffer 1026. In an example, the filters used in the calculation may be obtained by rearranging the forward-propagation filters.

The outputs of the neural functional units 1023 and 1024 may be stored in the third internal buffer 1027 to generate output activations. In an example, the output activations may be a combination of the input activations in the forward propagation and the input activations in the backwards propagation. Then, the output activations may be stored in the external memory 1010.

Figure 11:
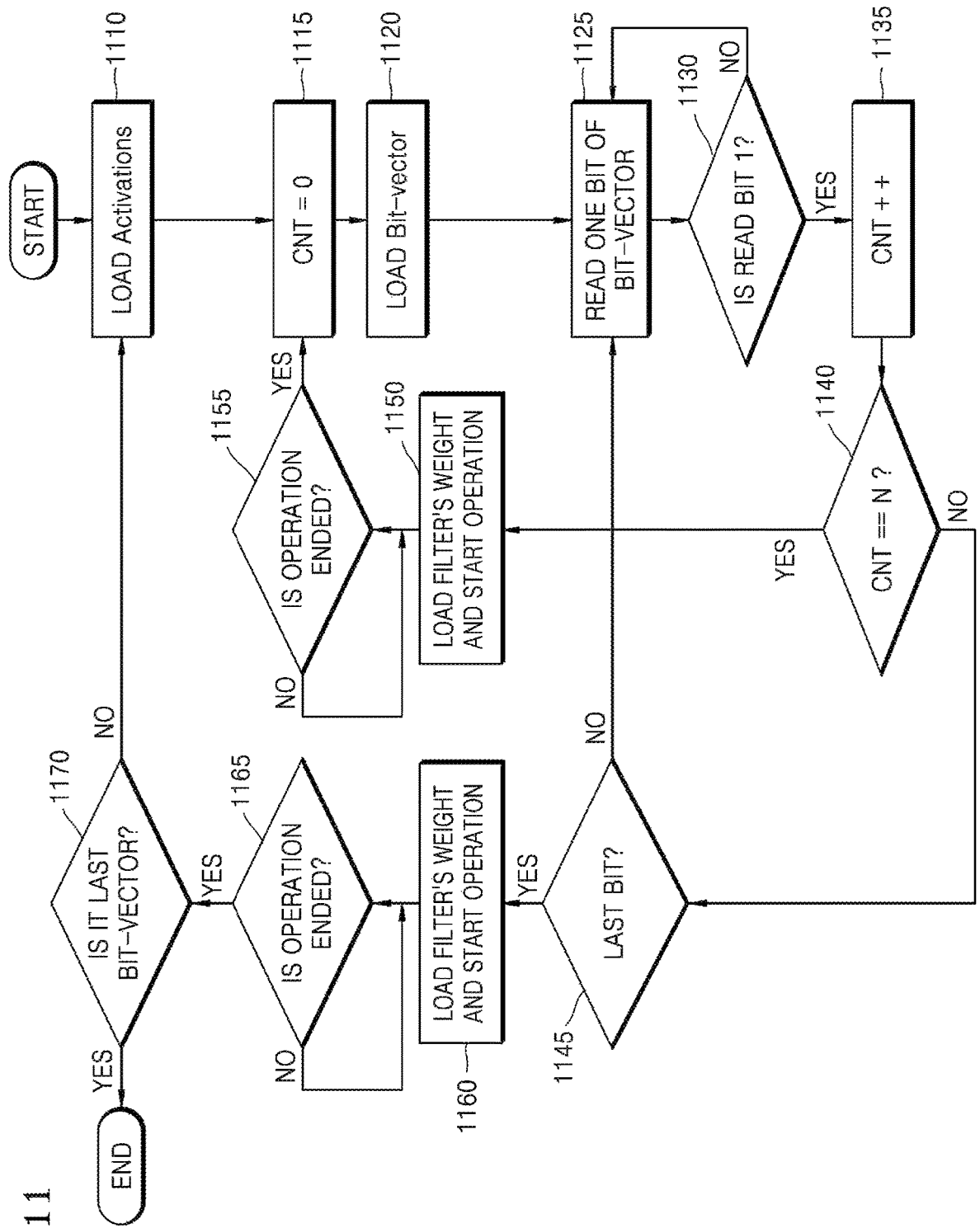
FIG. 11 is a diagram illustrating an example in which a neural network device operates.

FIG. 11 is a diagram illustrating an example in which a neural network device operates. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions.

The diagram illustrated in FIG. 11 may include operations that are processed in a time-series manner in the neural network devices 5 and 10 described above with reference to FIGS. 5 and 10. Thus, even when omitted below, the descriptions given above with respect to the neural network devices 5 and 10 illustrated in FIGS. 5 and 10 may also be applied to a method illustrated in the flowchart of FIG. 11. In addition to the description of FIG. 11 below, the descriptions of FIGS. 1-10 are also applicable to FIG. 11 and are incorporated herein by reference. Thus, the above description may not be repeated here.

In operations 1110 and 1115, the apparatus 1020 may read the activations from the external memory 1010 and set an activation count to a default value of "0".

In operations 1120 and 1125, the apparatus 1020 may read the bit-vector from the external memory 1010 and read the read bit-vector by one bit at a time.

In operation 1130, the apparatus 1020 may determine whether the value of the read bit is 1. Here, when the value of the bit is 1, it may mean that the activation corresponding to the bit is not zero (0). When the value of the bit is 1, the process proceeds to operation 1135; and when the value of the bit is 0, the process returns to operation 1125.

In operation 1135, the apparatus 1020 may increase the activation count by one.

In operation 1140, the apparatus 1020 may determine whether the activation count is equal to N. In an example, N denotes the number of multipliers included in the neural functional units 1023 and 1024. When the activation count is equal to N, the process proceeds to operation 1150; and otherwise, the process proceeds to operation 1145.

In operation 1145, the apparatus 1020 may determine whether the last bit of the bit-vector has been interpreted. When the interpretation up to the last bit of the bit-vector is completed, the process proceeds to operation 1160; and otherwise, the process proceeds to operation 1125.

In operations 1150 and 1155, the apparatus 1020 may read the filters from the external memory 1010 and perform a multiplication and accumulation operation by using the weights included in the filter. Here, the filter performed in the multiplication and accumulation operation may be obtained by rearranging the forward-propagation filter. When the multiplication and accumulation operation is ended, the process proceeds to operation 1115.

In operations 1160 and 1165, the apparatus 1020 may read the filters from the external memory 1010 and perform a multiplication and accumulation operation by using the weights included in the filter. Here, the filter performed in the multiplication and accumulation operation may be obtained by rearranging the forward-propagation filter. When the multiplication and accumulation operation is ended, the process proceeds to operation 1170.

In operation 1170, the apparatus 1020 may determine whether the interpretation of all bit-vectors is completed. When the interpretation of all bit-vectors is completed, the process is ended; and otherwise, the process proceeds to operation 1110 to read the next activations from the external memory 1010. Then, the apparatus 1120 may perform operations 1110 through 1170 on the newly-read activations.

FIG. 12 is a diagram illustrating an example in which a neural network device operates. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions.

In addition to the description of FIG. 12 below, the descriptions of FIGS. 1-10 are also applicable to FIG. 11 and are incorporated herein by reference. Specifically, operations 1220 to 1240 of FIG. 12 may correspond to operations 410 to 430 of FIG. 4. Thus, redundant descriptions of operations 1220 to 1240 will be omitted for conciseness.

In operation 1210, the neural network device 5 or 10 may perform forward propagation to generate a bit-vector. In an example, a method of generating the bit-vector may be the same as described above with reference to FIG. 6.

In operation 1250, the neural network device 5 or 10 may update the filters used in forward propagation by using the result of performing backward propagation. In an example, a method of updating the filters may be the same as described above with reference to FIG. 3.

According to the above description, the neural network device may select the activation required for the backward-propagation operation by using the bit-vector. Thus, since an operation on all activations may not need to be performed for the backward propagation, the costs required for the backward propagation may be reduced. Thus, it may be possible to train the neural network even with the amount of calculations, in less time and using fewer computing resources.

The neural network device 5, apparatus 520, neural network device 10, apparatus 1020, filter collector 1021, bit-vector generator 1022, neural functional units 1023 and 1024, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of accelerating a training process of a neural network. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of accelerating a training of a neural network through backpropagation process, the method comprising:
    in the backward propagation process:
       acquiring a bit-vector including bits indicating which of output activations of forward propagation operation of a layer of the neural network are zero or non-zero, the bit-vector having been generated in a process of a forward propagation of the neural network, with input activations of the layer in the backward propagation process respectively corresponding to the output activations;
       selecting, based on bits of the bit-vector indicating which of the input activations have values of 0, only non-zero activations and corresponding filters respectively from among the input activations and forward propagation filters of the layer used in the forward propagation operation;
       generating backward propagation filters of the layer by rearranging the selected corresponding filters, where there are fewer generated backward propagation filters than forward propagation filters;
       generating zero padded activations by performing zero padding on the selected non-zero activations; and
       performing the backward propagation using the zero padded activations and the backward propagation filters,
    wherein the selecting of the non-zero activations comprises selecting the non-zero activations based on an interpreting of the bits included in the bit-vector for a total number of the selected non-zero activations based on a total number of multipliers available for the performance of the backward propagation, or until the total number of the selected non-zero activations equals the total number of multipliers.

2. The method of claim 1, wherein the selecting of the non-zero activations includes selecting the non-zero activations until the total number of the selected non-zero activations is equal to the total number of multipliers of a single neural functional unit.

3. The method of claim 1, further comprising repeating the respective selecting, the generating of the backward propagation filters, the generating of the zero padded activations, and the performing of the backward propagation until all of the bits included in the bit-vector have been interpreted.

4. The method of claim 1, wherein the performing of the backward propagation comprises performing a multiplication and accumulation operation on the selected non-zero activations and the backward propagation filters.

5. The method of claim 4, wherein the performing of the backward propagation comprises updating the input activations using a result of the multiplication and accumulation operation.

6. The method of claim 1, further comprising updating the forward propagation filters, for use in another forward propagation of the neural network, using a result of the performing of the backward propagation.

7. A non-transitory computer-readable recording medium that, when executed by a processor, cause the processor to perform the method of claim 1.

8. A neural network device comprising:
a memory; and
one or more processors configured to:
in a backward propagation process for training a neural network:
acquire a bit-vector including bits indicating which output activations of a forward propagation operation of a layer of the neural network are zero or non-zero, the bit-vector being generated in a process of the a forward propagation of the neural network, with the output activations of the forward propagation being input activations of the layer in the backward propagation process respectively corresponding to the output activations;
select, based on bits of the bit-vector indicating which of the input output activations have values of 0, only non-zero activations and corresponding filters respectively from among the input activations and forward propagation filters of the layer used in the forward propagation operation, with a result of the selection of the corresponding filters including a storage of the selected corresponding filters to the memory;
generate backward propagation filters of the layer by rearranging the selected corresponding filters, where there are fewer generated backward propagation filters than forward propagation filters;
generate zero padded activations through performance of zero padding on the selected non-zero activations; and
perform the backward propagation using the zero padded activations and the backward propagation filters,
wherein, for the selecting of the non-zero activations, the at least one processor is configured to select the non-zero activations based on an interpreting of the bits included in the bit-vector for a total number of the selected non-zero activations based on a total number of multipliers available for the performance of the backward propagation, or until the total number of the selected non-zero activations equals the total number of multipliers.

9. The neural network device of claim 8, wherein, for the selecting of the non-zero activations, the one or more processors are further configured to select the non-zero activations until the total number of the selected non-zero activations is equal to the total number of multipliers of a single neural functional unit.

10. The neural network device of claim 8, wherein the one or more processors are further configured to repeat the respective selection, the generation of the backward propagation filters, the generation of the zero padded activations, and the performance of the backward propagation until all of the bits included in the bit-vector have been interpreted.

11. The neural network device of claim 8, wherein the one or more processors are further configured to perform a multiplication and accumulation operation on the selected non-zero activations and the backward propagation filters.

12. The neural network device of claim 11, wherein the one or more processors are further configured to update the input activations using a result of the multiplication and accumulation operation.

13. The neural network device of claim 8, wherein the one or more processors are further configured to update the forward propagation filters, for use in another forward propagation of the neural network, using a result of the performed backward propagation.

14. The neural network device of claim 13, wherein the one or more processors are further configured to store the updated forward propagation filters in the memory.

15. The method of claim 1, wherein respective values of all of the bits of the bit-vector that indicate the non-zero activations each have a value of 1.

16. The method of claim 1, wherein the selecting of the non-zero activations, from among the input activations, includes selecting the non-zero activations in parallel with a sequenced interpreting of the bits of the bit-vector, such that a first corresponding activation is selected upon the interpreting of the bits indicating that a bit of the bit vector indicates that the first corresponding activation is non-zero, and such that a second corresponding activation is selected upon a subsequent operation of the interpreting of the bits indicating that another bit of the bit vector indicates that the second corresponding activation is non-zero.

17. The method of claim 16, wherein the selecting of the non-zero activations in parallel with the interpreting of the bits of the bit-vector includes sequentially interpreting the bits of the bit-vector, and upon a result of each respective sequential interpreting of a respective bit of the bit-vector being that a corresponding activation is a non-zero activation, selecting the corresponding activation as a respective one of the non-zero activations.

18. The method of claim 1, further comprising, for each of respective input activations and respective bit vectors of plural layers of the neural network, repeating the selecting of the only non-zero activations, the selecting of the corresponding filters, the generating of the backward propagation filters, the generating of the zero padded activations, and the performing of the backward propagation until all bits included in the respective bit-vector of a corresponding layer have been interpreted in a corresponding interpreting, of the respective bit vector, in the repeated selecting of the only non-zero activations for the corresponding layer.

19. The method of claim 2, further comprising repeating the respective selecting, the generating of the backward propagation filters, the generating of the zero padded activations, and the performing of the backward propagation until all of the bits included in the bit-vector have been interpreted, including a final repetition where the total number of the selected non-zero activations is equal to or less than the total number of multipliers of the single neural functional unit.

20. The neural network device of claim 8, wherein, for each of respective input activations and respective bit vectors of plural layers of the neural network, the one or more processors are further configured to repeat the selection of the only non-zero activations and the corresponding filters, the generation of the backward propagation filters, the generation of the zero padded activations, and the performance of the backward propagation until all bits included in the respective bit-vector of a corresponding layer have been interpreted in a corresponding interpreting, of the respective bit vector, in the repeated selecting of the only non-zero activations for the corresponding layer.

21. The neural network device of claim 9, wherein the one or more processors are further configured to repeat the selection, the generation of the backward propagation filters, the generation of the zero padded activations, and the performance of the backward propagation until all of the bits included in the bit-vector have been interpreted, including a final repetition where the total number of the selected non-zero activations is equal to or less than the total number of multipliers of the single neural functional unit.

22. The method of claim 1, wherein the generating of the backward propagation filters includes generating each backward propagation filter by combining corresponding elements having a same z component in the selected corresponding filters.

23. The method of claim 1, wherein the number of the generated backward propagation filters is fewer than the number of the forward propagation filters.

24. The method of claim 1, wherein the input activations of the layer in the backward propagation process are respective activation gradients of the output activations, where the respective activation gradients are based on forward propagation filters of a subsequent layer of the neural network and corresponding activation gradients of output activations of the subsequent layer that were generated in the forward propagation of the neural network.

* * * * *